United States Patent
Sato

(10) Patent No.: US 11,460,365 B2
(45) Date of Patent: Oct. 4, 2022

(54) SEMICONDUCTOR PRESSURE SENSOR AND METHOD FOR MANUFACTURING THE SAME

(71) Applicant: Mitsubishi Electric Corporation, Tokyo (JP)

(72) Inventor: Kimitoshi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

(21) Appl. No.: 17/022,714

(22) Filed: Sep. 16, 2020

(65) Prior Publication Data

US 2021/0302252 A1  Sep. 30, 2021

(30) Foreign Application Priority Data

Mar. 30, 2020  (JP) .............................. JP2020-060701

(51) Int. Cl.
*G01L 9/00*  (2006.01)

(52) U.S. Cl.
CPC .......... *G01L 9/0052* (2013.01); *G01L 9/0042* (2013.01)

(58) Field of Classification Search
CPC .... G01L 9/0052; G01L 9/0042; G01L 9/0054
See application file for complete search history.

(56) References Cited

U.S. PATENT DOCUMENTS

| | | | | |
|---|---|---|---|---|
| 5,181,417 A | * | 1/1993 | Nishida | G01L 9/0042 73/114.18 |
| 5,220,838 A | | 6/1993 | Fung et al. | |
| 2006/0185437 A1 | * | 8/2006 | Sato | G01L 19/0069 73/754 |
| 2014/0331777 A1 | * | 11/2014 | Tomita | G01L 9/06 73/754 |
| 2016/0187215 A1 | * | 6/2016 | Kawano | G01L 9/0042 73/715 |
| 2016/0334292 A1 | * | 11/2016 | Oono | H01L 29/84 |
| 2019/0204171 A1 | * | 7/2019 | Inaba | B81B 7/0029 |
| 2019/0273200 A1 | | 9/2019 | Sato | |

FOREIGN PATENT DOCUMENTS

| | | |
|---|---|---|
| JP | 3259102 B2 | 2/2002 |
| JP | 2019-152568 A | 9/2019 |

* cited by examiner

*Primary Examiner* — Francis C Gray
(74) *Attorney, Agent, or Firm* — Studebaker & Brackett PC

(57) ABSTRACT

A semiconductor pressure sensor includes: a first semiconductor substrate; an insulating film provided on the first semiconductor substrate and including a main opening, an introduction opening, and a connection opening which connects the main opening and the introduction opening; a second semiconductor substrate bonded to the first semiconductor substrate with the insulating film interposed therebetween and including a diaphragm provided above the main opening and a receiving pressure inlet connected to the introduction opening; and a gauge resistor provided on the diaphragm and converting a deformation amount of the diaphragm into change in electrical characteristics.

10 Claims, 16 Drawing Sheets

SEMICONDUCTOR PRESSURE SENSOR AND METHOD FOR MANUFACTURING THE SAME

BACKGROUND OF THE INVENTION

Field

The present disclosure relates to a semiconductor pressure sensor and a method for manufacturing the same.

Background

In a conventional semiconductor pressure sensor which measures a differential pressure between two sides of a diaphragm, the diaphragm is formed through processing from a rear surface of a silicon substrate (see, for example, JP 3259102 B).

SUMMARY

However, processing of a rear surface of a substrate complicates manufacturing process, causing a problem of increase in manufacturing cost.

The present disclosure has been made to solve the problem as described above, and an object of the present disclosure is to obtain a semiconductor pressure sensor which allows for reduction in manufacturing cost, and a method for manufacturing the same.

A semiconductor device according to the present disclosure includes: a first semiconductor substrate; an insulating film provided on the first semiconductor substrate and including a main opening, an introduction opening, and a connection opening which connects the main opening and the introduction opening; a second semiconductor substrate bonded to the first semiconductor substrate with the insulating film interposed therebetween and including a diaphragm provided above the main opening and a receiving pressure inlet connected to the introduction opening; and a gauge resistor provided on the diaphragm and converting a deformation amount of the diaphragm into change in electrical characteristics.

In the present disclosure it is possible to detect a differential pressure between two sides of the diaphragm only by forming the receiving pressure inlet in the second silicon substrate of a cavity SOI substrate obtained by bonding the first silicon substrate and the second silicon substrate to each other with the silicon oxide film, which has the openings, interposed therebetween. As such, because processing of a rear surface of the substrate for forming the diaphragm becomes unnecessary, it is possible to reduce the manufacturing cost.

Other and further objects, features and advantages of the invention will appear more fully from the following description.

DESCRIPTION OF EMBODIMENTS

A semiconductor pressure sensor and a method for manufacturing the same according to the embodiments of the present disclosure will be described with reference to the drawings. The same components will be denoted by the same symbols, and the repeated description thereof may be omitted.

First Embodiment

Figure 1:
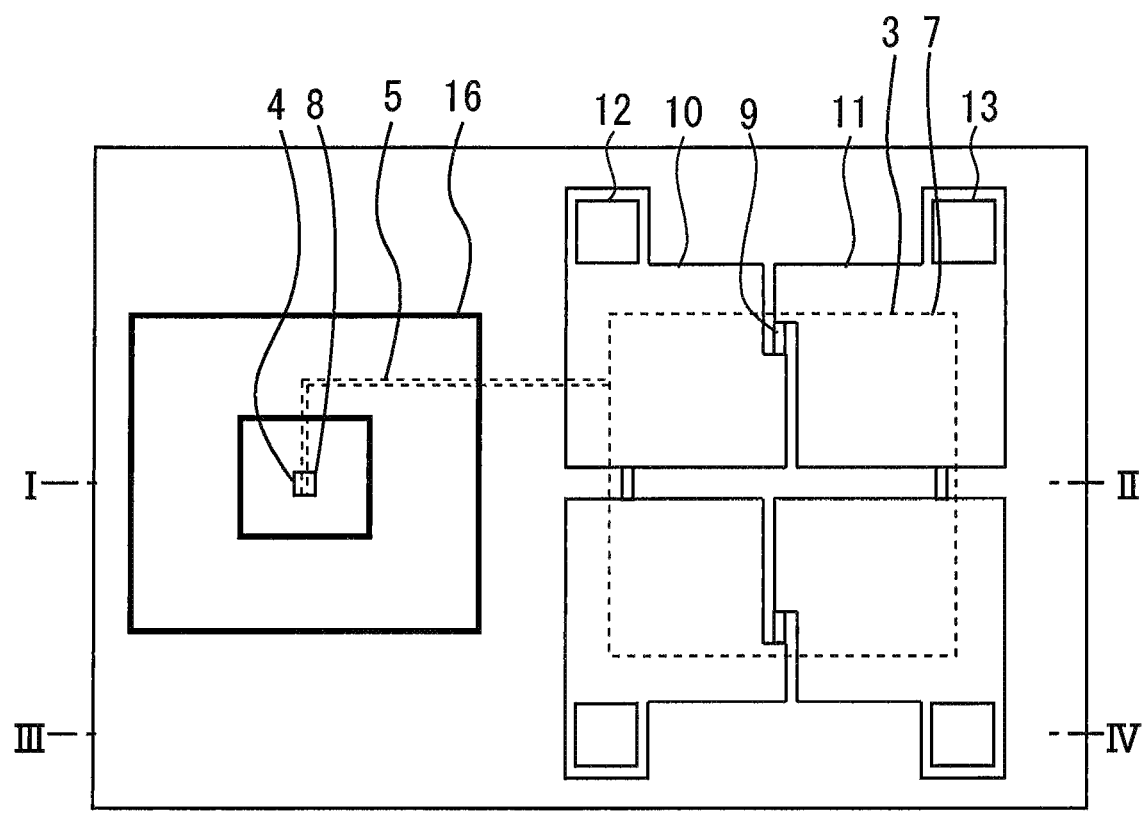
FIG. 1 is a plan view illustrating a semiconductor pressure sensor according to a first embodiment.
Figure 2:
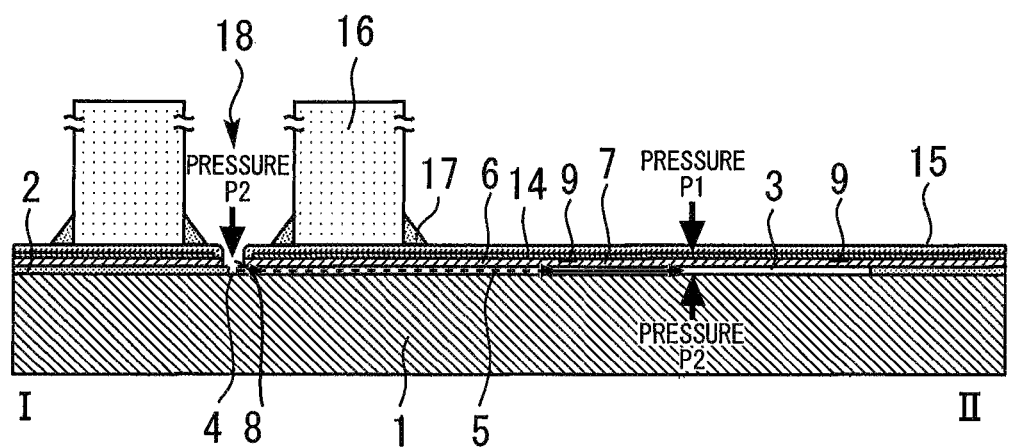
FIG. 2 is a cross-sectional view along I-II in FIG. 1.
Figure 3:
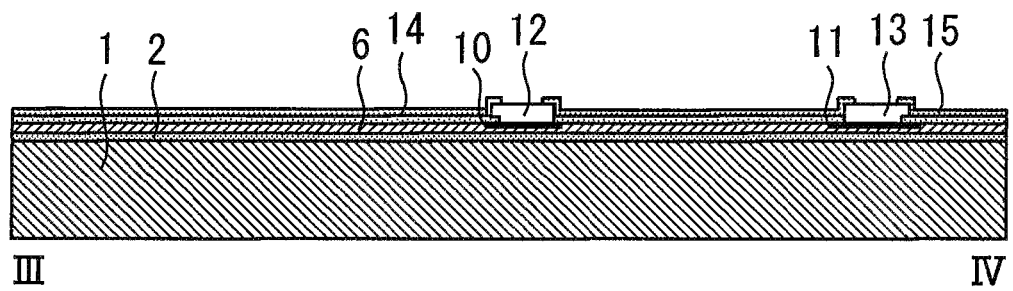
FIG. 3 is a cross-sectional view along III-IV in FIG. 1.

FIG. 1 is a plan view illustrating a semiconductor pressure sensor according to a first embodiment. FIG. 2 is a cross-sectional view along I-II in FIG. 1. FIG. 3 is a cross-sectional view along III-IV in FIG. 1.

A conductivity type of a first silicon substrate 1 may be either an n type or p type. Further, because the first silicon substrate 1 is a base silicon substrate of an SOI substrate, the first silicon substrate 1 has a thickness of approximately 200 to 900 µm.

A silicon oxide film 2 is provided on the first silicon substrate 1. The silicon oxide film 2 includes a main opening 3, an introduction opening 4 which is smaller than the main opening 3, and a connection opening 5 which connects the main opening 3 and the introduction opening 4. A thickness of the silicon oxide film 2 is approximately 0.5 to 5 μm.

A second silicon substrate 6 is bonded to the first silicon substrate 1 with the silicon oxide film 2 interposed therebetween. The second silicon substrate 6 is an n type silicon substrate. The main opening 3 of the silicon oxide film 2 surrounded by the first silicon substrate 1 and the second silicon substrate 6 becomes a cavity. A portion of the second silicon substrate 6 on this cavity becomes a diaphragm 7. A thickness of the diaphragm 7 is approximately 5 to 30 μm. In the second silicon substrate 6, a receiving pressure inlet 8 connected to the introduction opening 4 is provided.

p-type gauge resistors 9 are provided at four sides of the diaphragm 7. The gauge resistor 9 is a piezo resistor having an elongated rectangular shape in planar view. The gauge resistor 9 has diffused surface concentration of approximately 5e17 to 5e18 ions/cm$^3$, and has a diffusion depth of approximately 0.5 to 1.5 μm in terms of balance between a resistance value and a resistance value change amount with respect to stress. The gauge resistors 9 are connected to each other through Wheatstone Bridge connection with diffusion wirings 10 and 11. It is necessary to set resistance of the diffusion wirings 10 and 11 at low resistance, and diffused surface concentration is approximately 1e19 to 1e20 ions/cm$^3$, and a diffusion depth is approximately 2 to 5 μm. An electrode 12 is formed on the diffusion wiring 10 connected to one end of the gauge resistor 9. An electrode 13 is formed on the diffusion wiring 11 connected to the other end of the gauge resistor 9. A silicon oxide film 14 is formed on the second silicon substrate 6, and a passivation film 15 is formed on the silicon oxide film 14.

A pressure separating part 16 is adhered on an upper surface of the second silicon substrate 6 around the receiving pressure inlet 8 with an adhesion layer 17. Inside of the pressure separating part 16, a pressure port 18 which receives a pressure P2 is provided. The pressure port 18 is completely separated from space on an upper surface side of the second silicon substrate 6 by the pressure separating part 16, so that a pressure at the pressure port 18 is different from a pressure in the space on the upper surface side of the second silicon substrate 6. That is, the pressure separating part 16 separates a pressure P1 which is received on the upper surface of the diaphragm 7 from the pressure P2 which is received at the receiving pressure inlet 8.

In the semiconductor pressure sensor according to the present embodiment, the pressure port 18 is connected to an external pressure inlet which is not illustrated. The pressure P2 received from the pressure port 18 passes through the receiving pressure inlet 8, the connection opening 5 which is a pressure inlet path, and a cavity of the main opening 3, and is applied to a lower surface of the diaphragm 7.

If the pressure P1 is applied on the upper surface of the diaphragm 7, and the pressure P2 is applied on the lower surface, the diaphragm 7 is deformed in accordance with its pressure difference (P1-P2). Stress in accordance with a deformation amount of this diaphragm 7 is applied to the gauge resistors 9. The gauge resistors 9 have characteristics that resistance values change in accordance with a magnitude of the applied stress. Therefore, by connecting the gauge resistors 9 through Wheatstone Bridge connection, it is possible to detect change in the resistance values as output voltages. That is, the gauge resistors 9 convert the deformation amount of the diaphragm 7 into change in electrical characteristics. The output voltages of the gauge resistors 9 are transmitted to outside from the electrodes 12 and 13 connected to the respective diffusion wirings 10 and 11.

Figure 4:
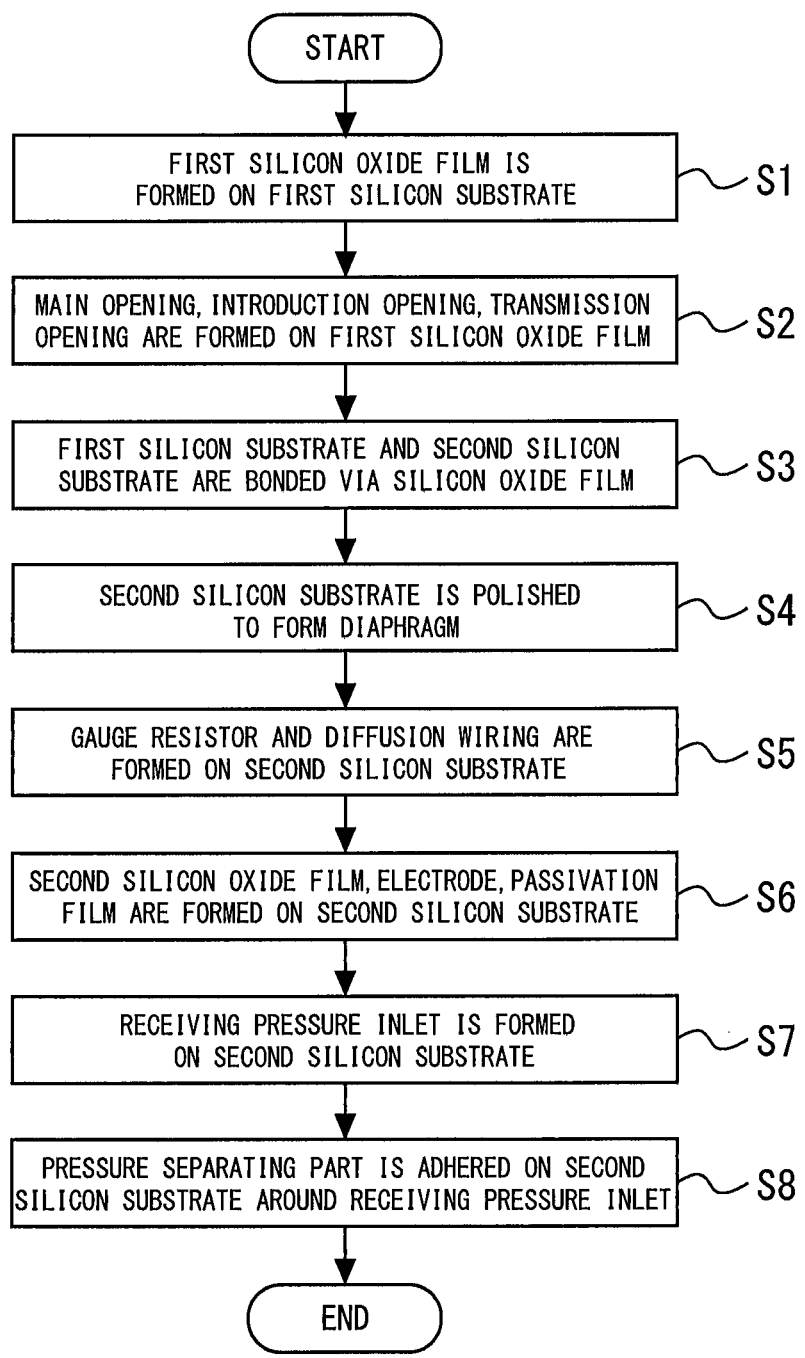
FIG. 4 is a flowchart of the manufacturing process of the semiconductor pressure sensor according to the first embodiment.
Figure 5:
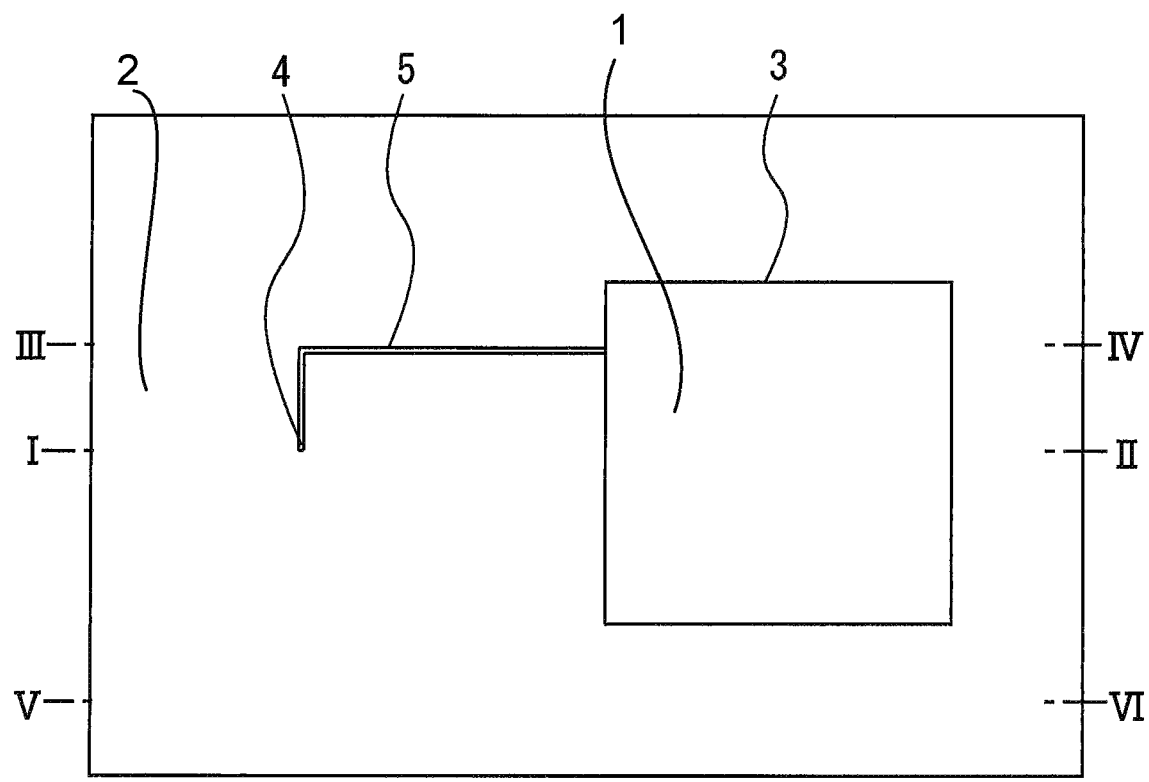
FIG. 5 is a plan view illustrating the manufacturing process of the semiconductor pressure sensor according to the first embodiment.
Figure 6:
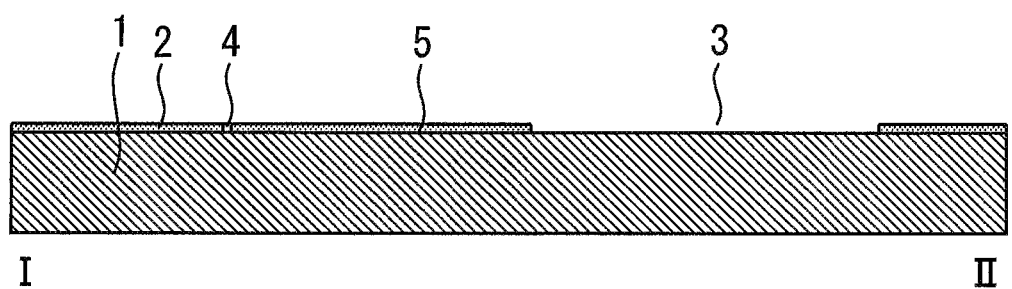
FIG. 6 is a cross-sectional view along I-II in FIG. 5.
Figure 7:
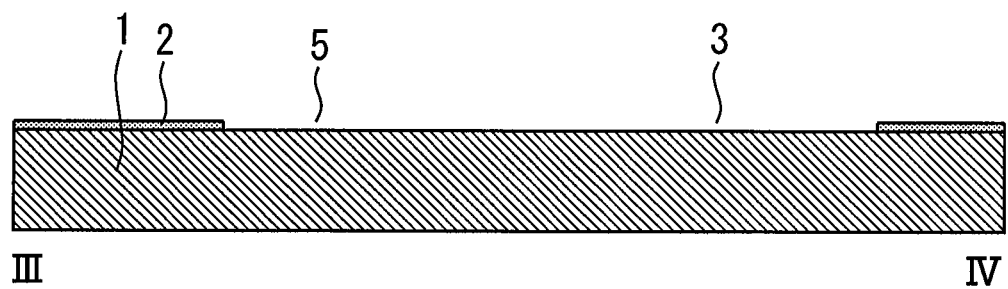
FIG. 7 is a cross-sectional view along III-IV in FIG. 5.
Figure 8:
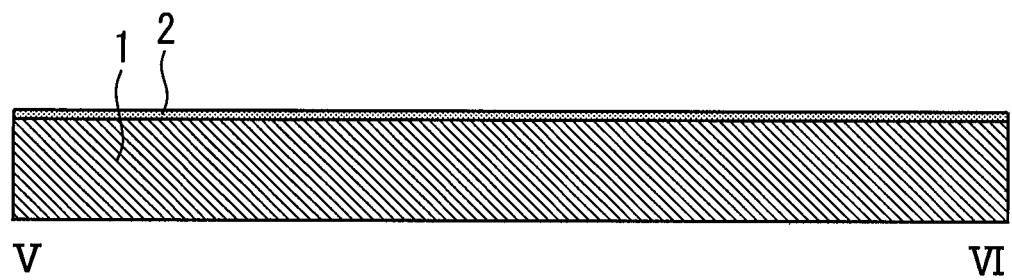
FIG. 8 is a cross-sectional view along V-VI in FIG. 5.
Figure 12:
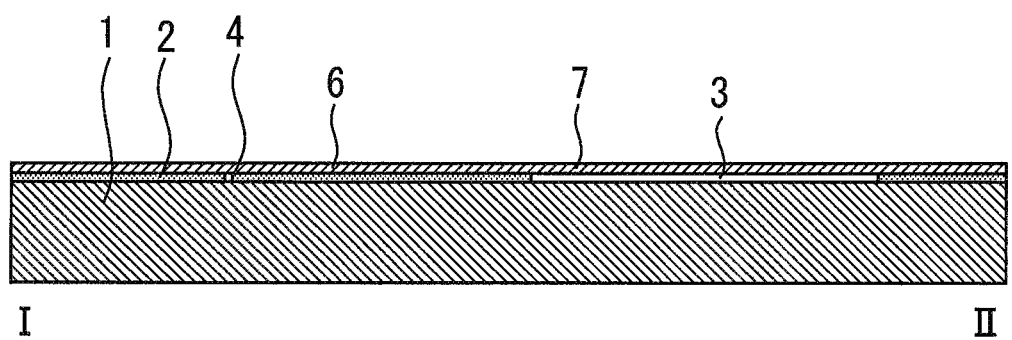
FIG. 12 is a cross-sectional view along I-II in FIG. 11.
Figure 13:
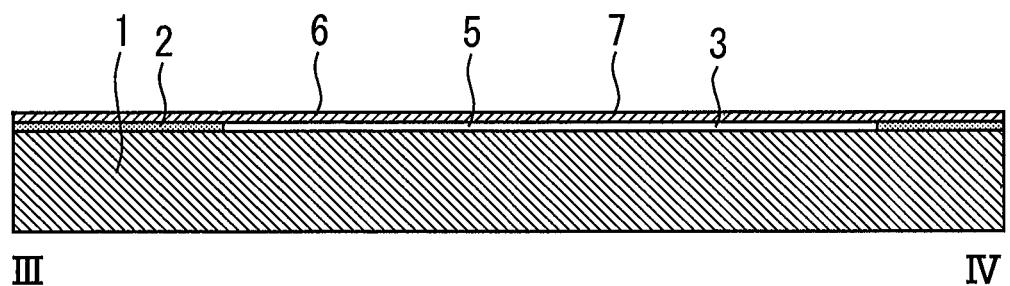
FIG. 13 is a cross-sectional view along III-IV in FIG. 11.
Figure 14:
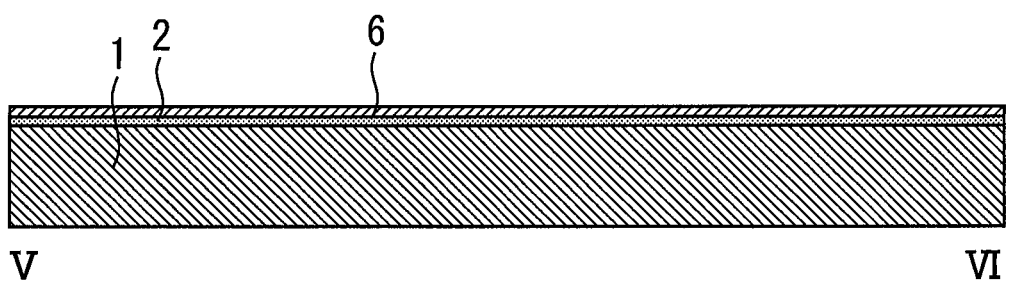
FIG. 14 is a cross-sectional view along V-VI in FIG. 11.
Figure 15:
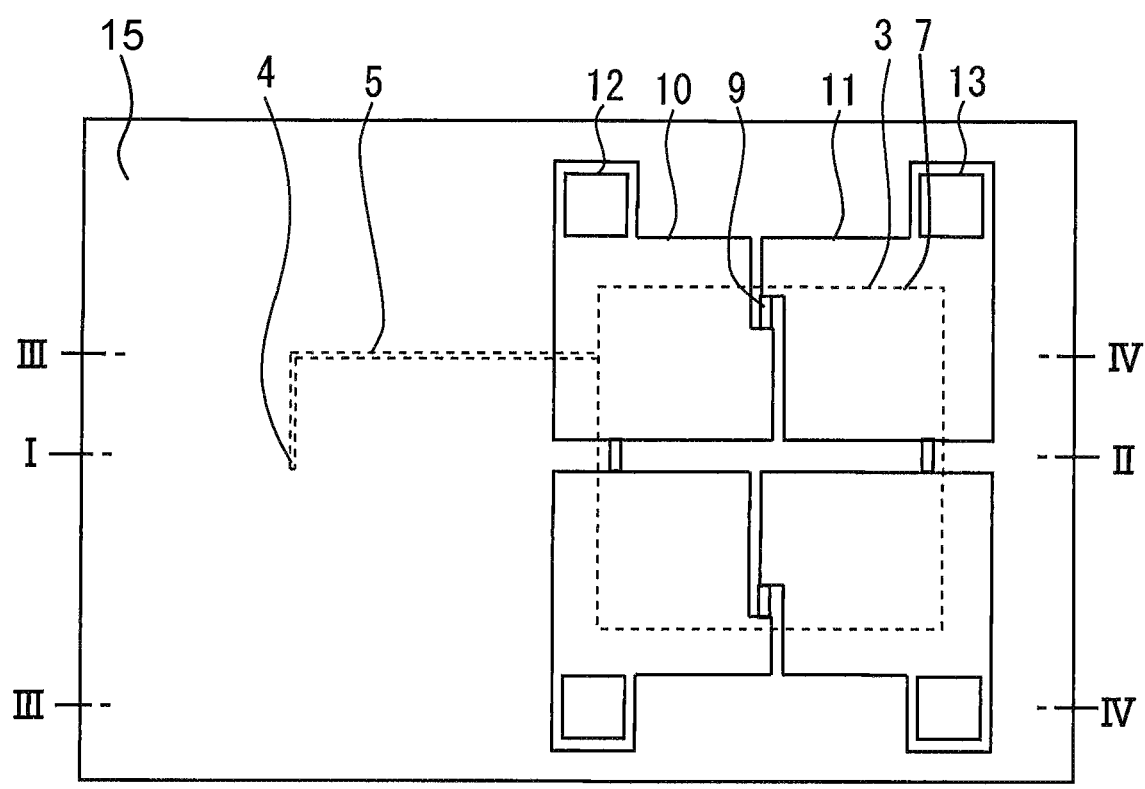
FIG. 15 is a plan view illustrating the manufacturing process of the semiconductor pressure sensor according to the first embodiment.
Figure 16:
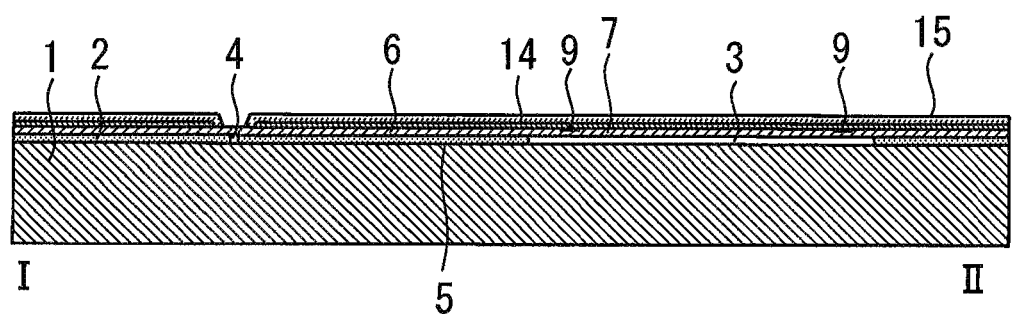
FIG. 16 is a cross-sectional view along I-II in FIG. 15.
Figure 17:
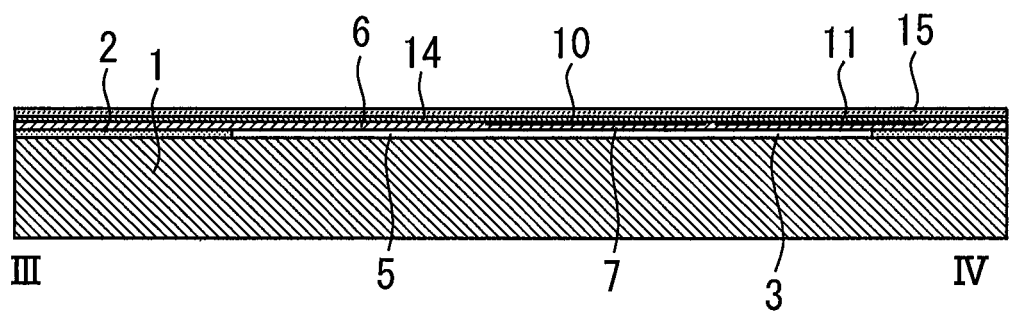
FIG. 17 is a cross-sectional view along III-IV in FIG. 15.
Figure 18:
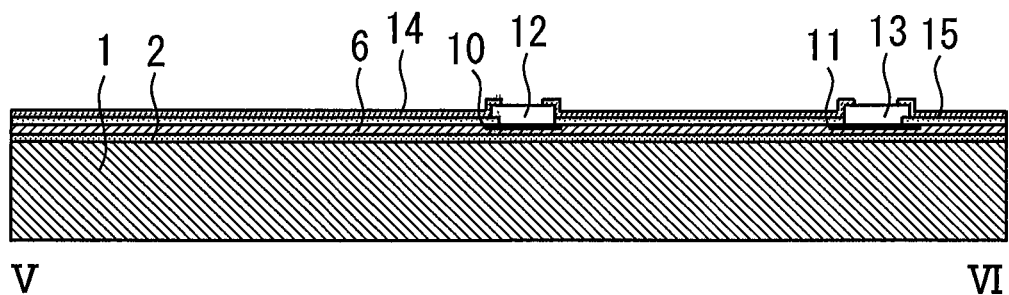
FIG. 18 is a cross-sectional view along V-VI in FIG. 15.
Figure 19:
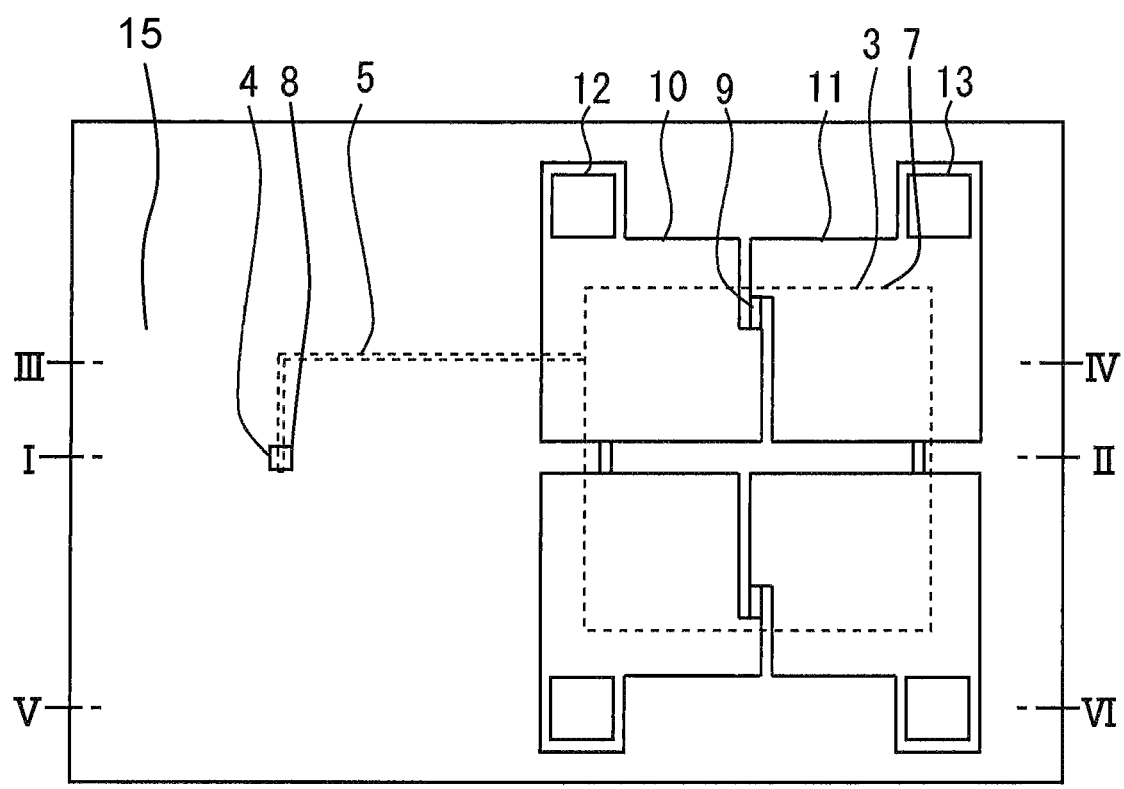
FIG. 19 is a plan view illustrating the manufacturing process of the semiconductor pressure sensor according to the first embodiment.
Figure 20:
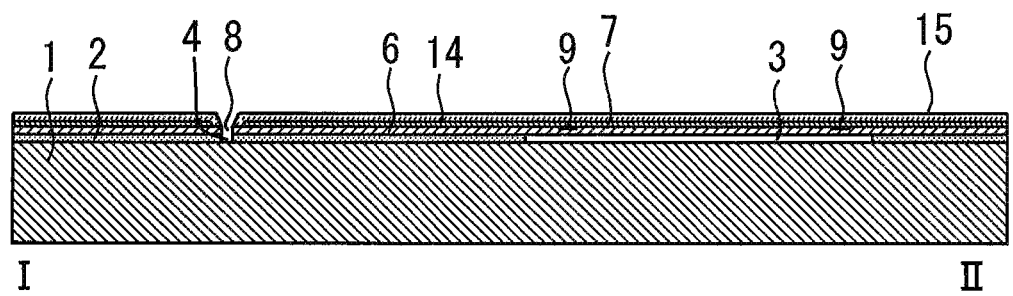
FIG. 20 is a cross-sectional view along I-II in FIG. 19.
Figure 21:
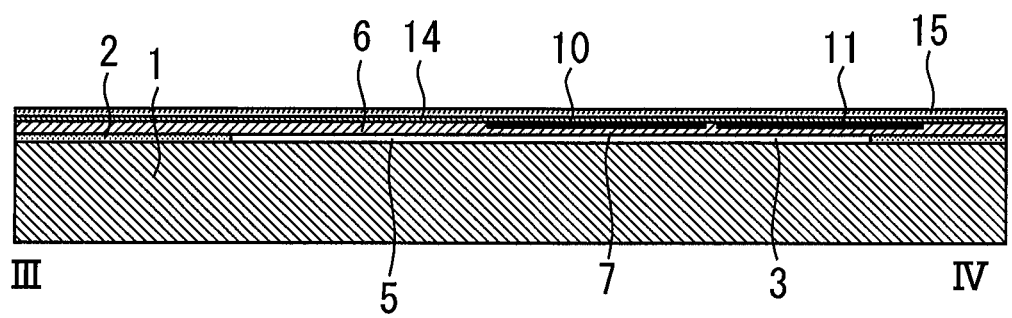
FIG. 21 is a cross-sectional view along III-IV in FIG. 19.
Figure 22:
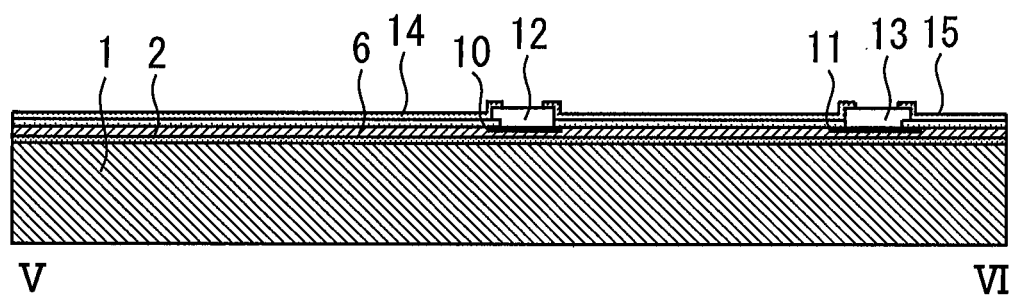
FIG. 22 is a cross-sectional view along V-VI in FIG. 19.

Subsequently, manufacturing process of the semiconductor pressure sensor according to the present embodiment will be described. FIG. 4 is a flowchart of the manufacturing process of the semiconductor pressure sensor according to the first embodiment. FIGS. 5, 9, 11, 15, 19 and 23 are plan views illustrating the manufacturing process of the semiconductor pressure sensor according to the first embodiment. FIG. 6 is a cross-sectional view along I-II in FIG. 5. FIG. 7 is a cross-sectional view along III-IV in FIG. 5. FIG. 8 is a cross-sectional view along V-VI in FIG. 5. FIG. 10 is a cross-sectional view along I-II in FIG. 9. FIG. 12 is a cross-sectional view along I-II in FIG. 11. FIG. 13 is a cross-sectional view along III-IV in FIG. 11. FIG. 14 is a cross-sectional view along V-VI in FIG. 11. FIG. 16 is a cross-sectional view along I-II in FIG. 15. FIG. 17 is a cross-sectional view along III-IV in FIG. 15. FIG. 18 is a cross-sectional view along V-VI in FIG. 15. FIG. 20 is a cross-sectional view along I-II in FIG. 19. FIG. 21 is a cross-sectional view along III-IV in FIG. 19. FIG. 22 is a cross-sectional view along V-VI in FIG. 19. FIG. 24 is a cross-sectional view along I-II in FIG. 23.

First, as illustrated in FIGS. 5 to 8, the silicon oxide film 2 is formed on the first silicon substrate 1 (step S1). Specifically, the silicon oxide film 2 is formed by the first silicon substrate 1 being heated at approximately 700 to 1100° C. in the presence of oxygen to oxidize a surface of the substrate and make a silicon thermally oxidized film. Then, by photoengraving process and etching processing being performed on the silicon oxide film 2, the main opening 3, the introduction opening 4, and the connection opening 5 which connects the main opening 3 and the introduction opening 4 are formed (step S2).

Figure 9:
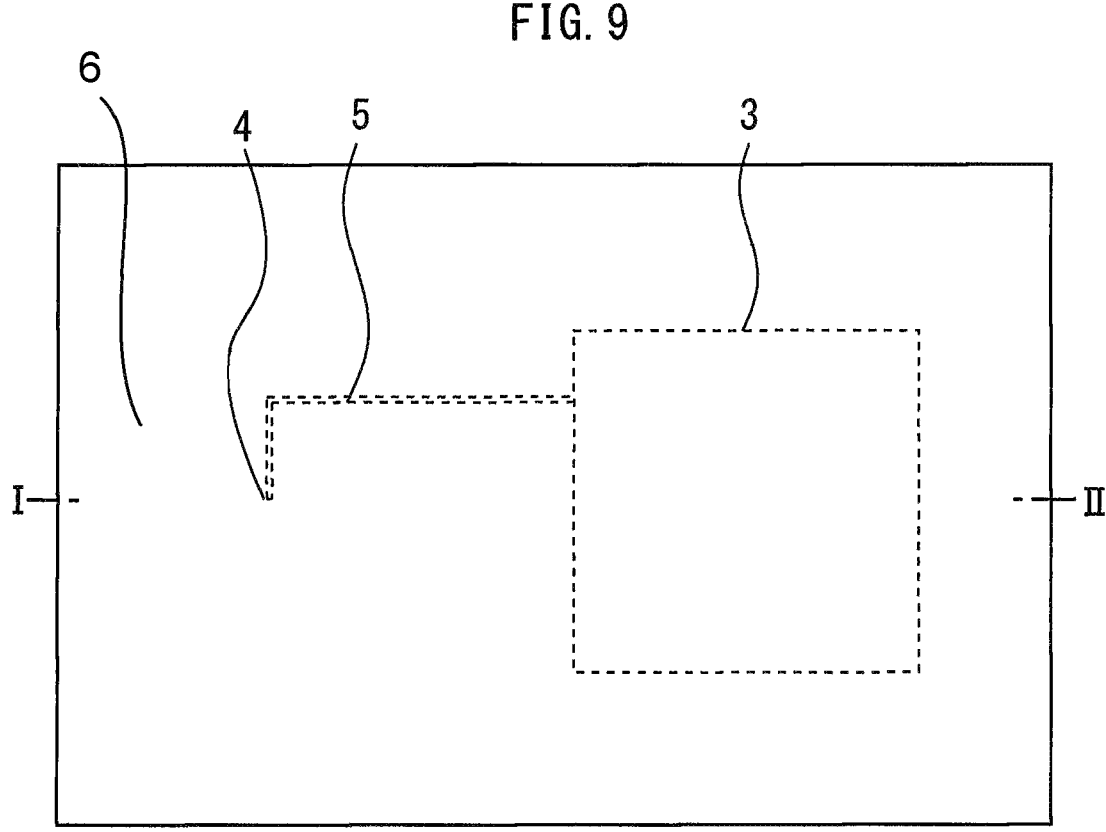
FIG. 9 is a plan view illustrating the manufacturing process of the semiconductor pressure sensor according to the first embodiment.
Figure 10:
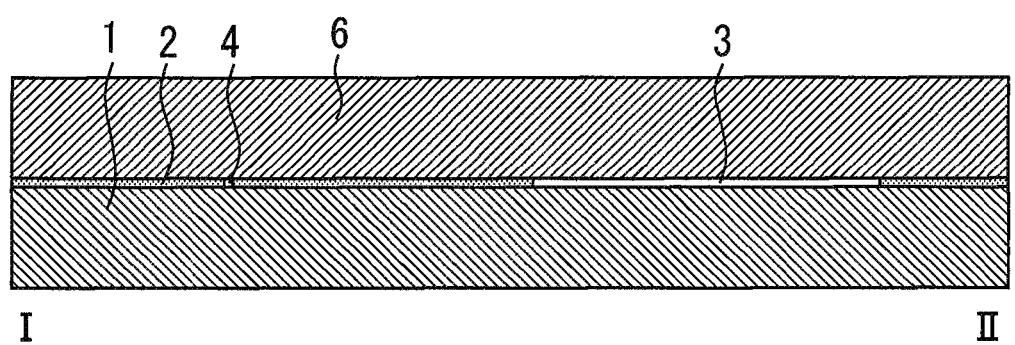
FIG. 10 is a cross-sectional view along I-II in FIG. 9.
Figure 11:
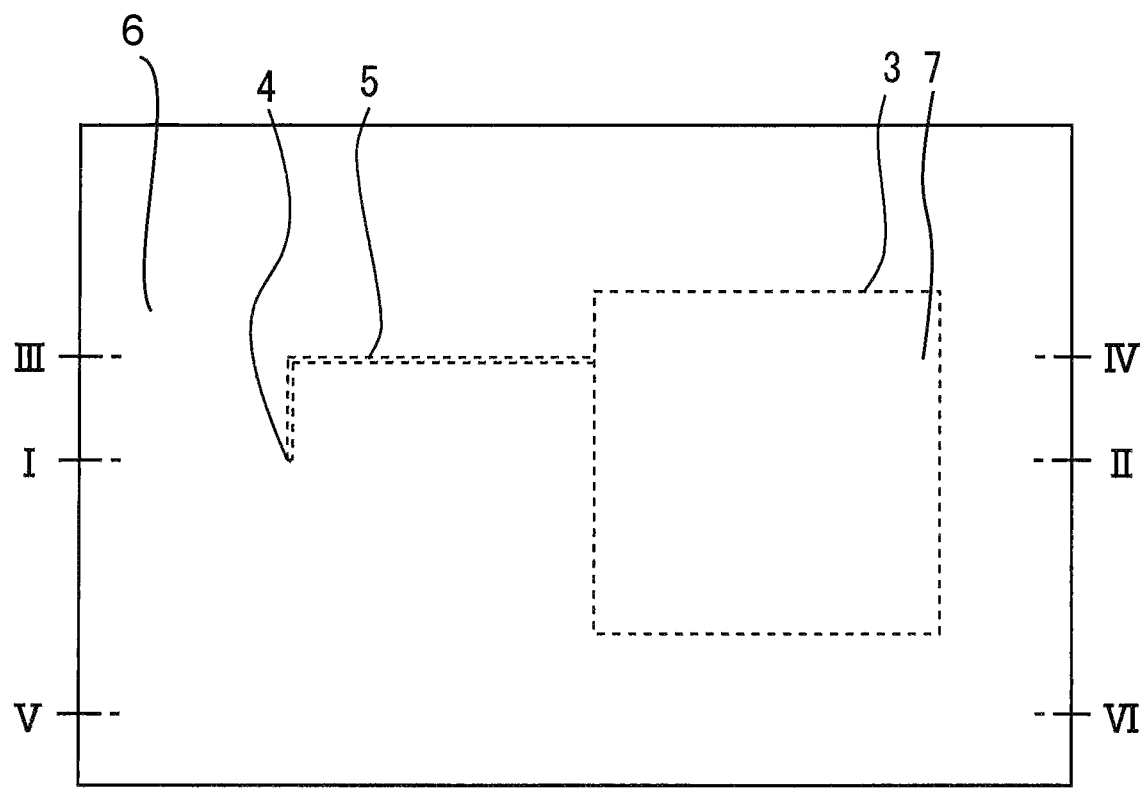
FIG. 11 is a plan view illustrating the manufacturing process of the semiconductor pressure sensor according to the first embodiment.

Then, as illustrated in FIGS. 9 and 10, the second silicon substrate 6 is attached to the first silicon substrate 1 with the silicon oxide film 2 interposed therebetween, which are then subjected to heat treatment to be bonded to each other (step S3).

Then, as illustrated in FIGS. 11 to 14, the entire surface of the upper surface of the second silicon substrate 6 is polished to form the diaphragm 7 above the main opening 3 (step S4). A polishing amount is adjusted so that the diaphragm 7 has a desired thickness. It is possible to adjust detection sensitivity with respect to a pressure by the thickness of the diaphragm 7.

Then, as illustrated in FIGS. 15 to 18, after the second silicon substrate 6 is subjected to oxidation treatment and photoengraving process, impurities are injected. Concentration of the impurities to be injected is approximately 5e14 to 5e15 ions/cm$^2$. Then, annealing treatment at approximately 1000 to 1100° C., and oxidation treatment at approximately 100 to 500 nm are performed. By this means, the diffusion wirings 10 and 11 whose resistance is low and which have diffusion depth of approximately 2 to 5 μm are formed on the second silicon substrate 6. After oxidation treatment and photoengraving process are performed in a similar manner, by impurity ions being injected to part of a region of the diaphragm 7 which overlaps with the main opening 3 in planar view, and annealing treatment being performed, the gauge resistors 9 are formed at four sides of the diaphragm 7 so that the gauge resistors 9 are connected with the diffusion wirings 10 and 11 (step S5). By this means, the gauge resistors 9 are connected through Wheatstone bridge connection with the diffusion wiring 10.

Here, concentration of impurities of the gauge resistors 9 is approximately 1e13 to 1e14 ions/cm$^2$. If the concentration of impurities is reduced, because temperature characteristics degrade although sensitivity with respect to change in a pressure becomes high, the concentration is set at optimal concentration in view of trade-off between sensitivity and temperature characteristics. In the present embodiment, all the oxide film which has been deposited upon formation of the diffusion wirings 10 and 11, and the gauge resistors 9 is removed. Then, the silicon oxide film 14 is formed on the second silicon substrate 6 again. By this means, the silicon oxide film 14 on the surface of the diaphragm 7 becomes flat, so that deformation characteristics of the diaphragm with respect to change in a pressure are improved. A PSG or BPSG film is deposited on the silicon oxide film 14 as the passivation film 15 (step S6).

Then, to take out an electrical signal from the diffusion wirings 10 and 11 to outside, contact holes (not illustrated) are formed on the silicon oxide film 14 and the passivation film 15 by photoengraving process and etching processing being performed. Then, after a metal film of AlSi, AlCu, Al, AlSiCu, or the like, is deposited on a surface, the electrodes 12 and 13 are formed at the contact holes (not illustrated) by photoengraving process and etching processing being performed. Then, after a nitride film formed through, for example, plasma CVD is deposited on an entire surface as a protection film, the entire surface is protected by only a desired position being opened by photoengraving process and etching processing being performed.

Then, as illustrated in FIGS. 19 to 22, the receiving pressure inlet 8 is formed at a position which overlaps with the introduction opening 4 in planar view by photoengraving process and etching processing being performed on the second silicon substrate 6 (step S7). The receiving pressure inlet 8 penetrates the second silicon substrate 6 and is connected to the introduction opening 4.

Figure 23:
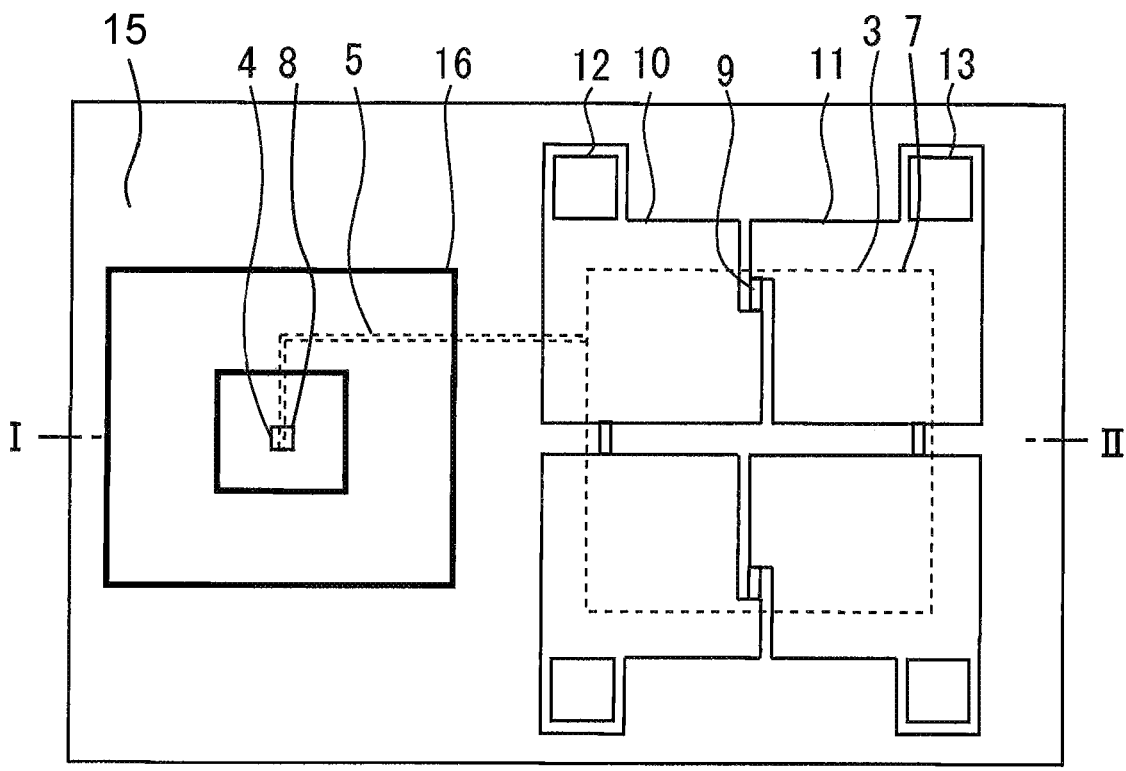
FIG. 23 is a plan view illustrating the manufacturing process of the semiconductor pressure sensor according to the first embodiment.
Figure 24:
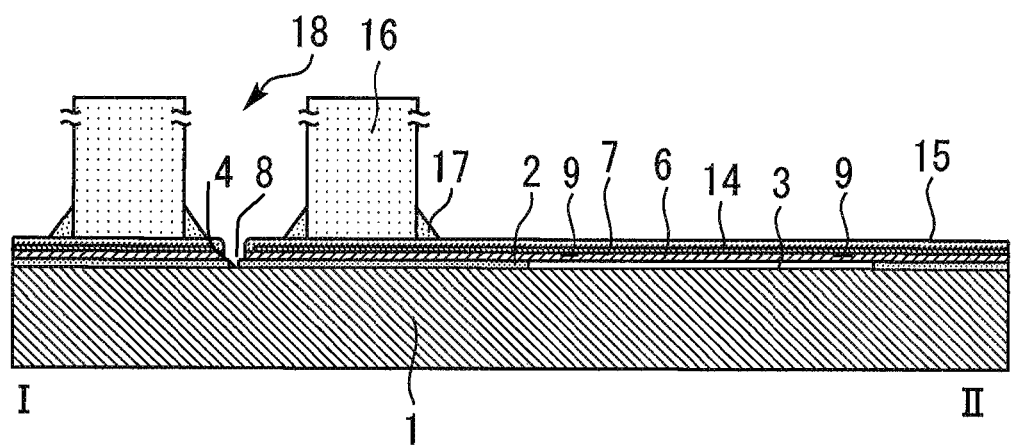
FIG. 24 is a cross-sectional view along I-II in FIG. 23.

Then, as illustrated in FIGS. 23 and 24, the pressure separating part 16 is adhered on an upper surface of the second silicon substrate 6 around the receiving pressure inlet 8 with an adhesion layer 17 (step S8). By this means, a pressure port 18 surrounded by the pressure separating part 16 is formed.

As described above, in the present embodiment, it is possible to detect a differential pressure between two sides of the diaphragm 7 only by forming the receiving pressure inlet 8 in the second silicon substrate 6 of a cavity SOI substrate obtained by bonding the first silicon substrate 1 and the second silicon substrate 6 to each other with the silicon oxide film 2, which has the openings, interposed therebetween. As such, because processing of a rear surface of the substrate for forming the diaphragm 7 becomes unnecessary, it is possible to reduce the manufacturing cost.

Detection sensitivity with respect to change in a pressure can be controlled by a thickness of the diaphragm 7 set by a thickness of the second silicon substrate 6 and an area of the diaphragm 7 on the cavity set by an area of the main opening 3.

Because the semiconductor pressure sensor is designed such that a higher pressure is applied on the upper surface side of the diaphragm 7 than on the lower surface side, the diaphragm 7 is deformed to a side of the first silicon substrate 1. At this time, the first silicon substrate 1 on a bottom surface of the cavity becomes a stopper of the diaphragm 7. Therefore, a height of the main opening 3 is set by a thickness of the silicon oxide film 2, and a range of movement of the diaphragm 7 is determined. Accordingly, the thickness of the silicon oxide film 2 is set so as to prevent stress equal to or greater than breaking stress of the diaphragm 7 from being applied. For example, in a case of a semiconductor pressure sensor which detects a differential pressure of approximately 1 atmosphere, if a size of the diaphragm 7 is set at 400 square, and a thickness is set at 10 μm, the thickness of the silicon oxide film 2 is set at approximately 1.5 μm. By this means, the first silicon substrate 1 contacts the diaphragm 7 and functions as the stopper through application of a pressure of approximately 5 atmospheres. As such, it is possible to prevent breaking of the diaphragm 7 even in a case where an excessive pressure is applied on the upper surface of the diaphragm 7.

Second Embodiment

Figure 25:
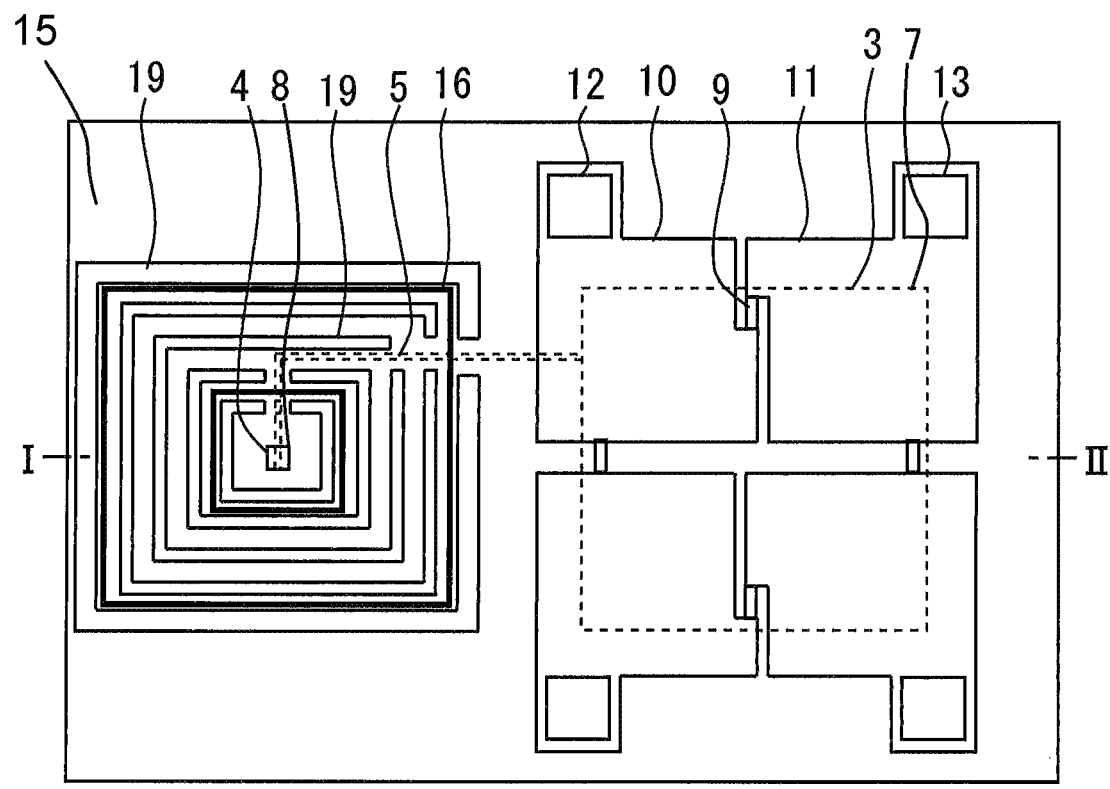
FIG. 25 is a plan view illustrating a semiconductor pressure sensor according to a second embodiment.
Figure 26:
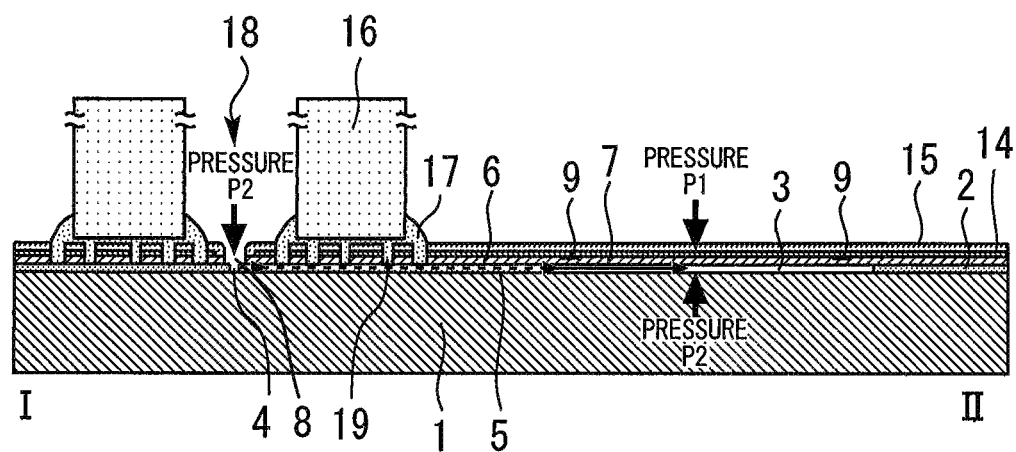
FIG. 26 is a cross-sectional view along I-II in FIG. 25.

FIG. 25 is a plan view illustrating a semiconductor pressure sensor according to a second embodiment. FIG. 26 is a cross-sectional view along I-II in FIG. 25. The pressure separating part 16 is adhered on the upper surface of the second silicon substrate 6 around the receiving pressure inlet 8 with the adhesion layer 17. An adhesion layer holding groove 19 which holds this adhesion layer 17 is provided on the upper surface of the second silicon substrate 6 around the receiving pressure inlet 8. The adhesion layer holding groove 19 is formed through photoengraving process and etching processing at the same time as the receiving pressure inlet 8 being formed. Other configurations and manufacturing process are similar to those of the first embodiment.

Because the adhesion layer holding groove 19 stops spread of the adhesion layer 17, it is possible to prevent the adhesion layer 17 from spreading out to the receiving pressure inlet 8 or the diaphragm 7. As such, it is possible to further reduce the manufacturing cost.

Third Embodiment

Figure 27:
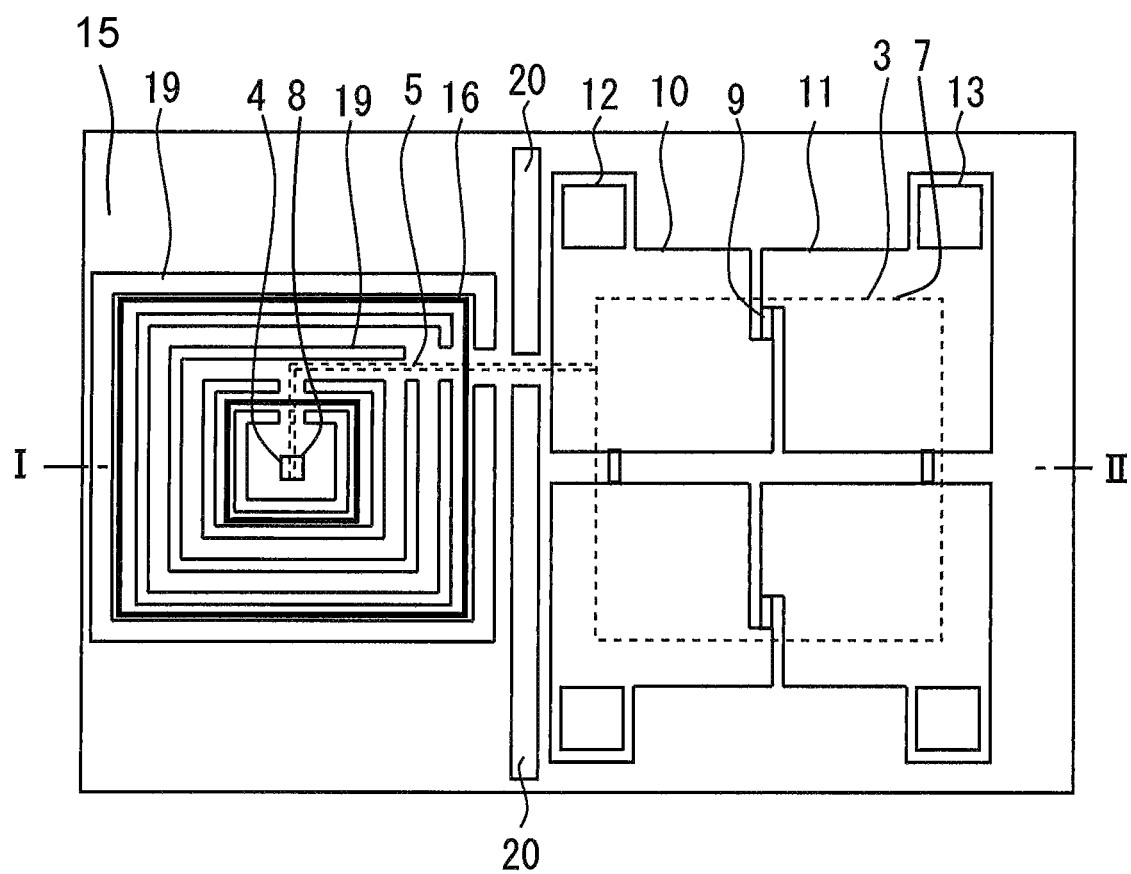
FIG. 27 is a plan view illustrating a semiconductor pressure sensor according to a third embodiment.
Figure 28:
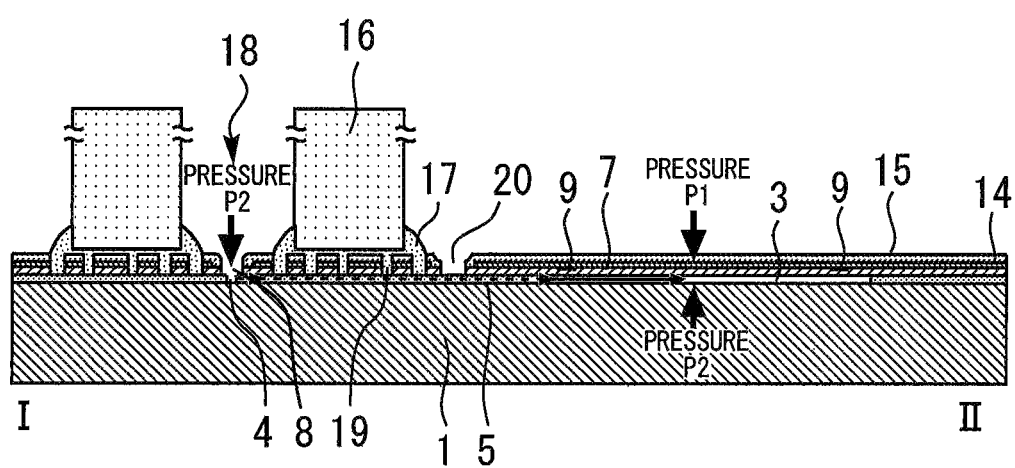
FIG. 28 is a cross-sectional view along I-II in FIG. 27.

FIG. 27 is a plan view illustrating a semiconductor pressure sensor according to a third embodiment. FIG. 28 is a cross-sectional view along I-II in FIG. 27. The pressure separating part 16 is adhered to the second silicon substrate 6 around the receiving pressure inlet 8. Between this adhesion portion and the diaphragm 7, an adhesion stress separating groove 20 is provided on the upper surface of the second silicon substrate 6. The adhesion stress separating groove 20 is formed through photoengraving process and etching processing at the same time as the receiving pressure inlet 8 being formed. Other configurations and manufacturing process are similar to those of the first and the second embodiments.

By the adhesion stress separating groove 20, it is possible to prevent stress occurring when the pressure separating part 16 is adhered to the second silicon substrate 6 from affecting the diaphragm 7. Consequently, it is possible to detect change in a pressure with high accuracy from deformation of the diaphragm 7.

Fourth Embodiment

Figure 29:
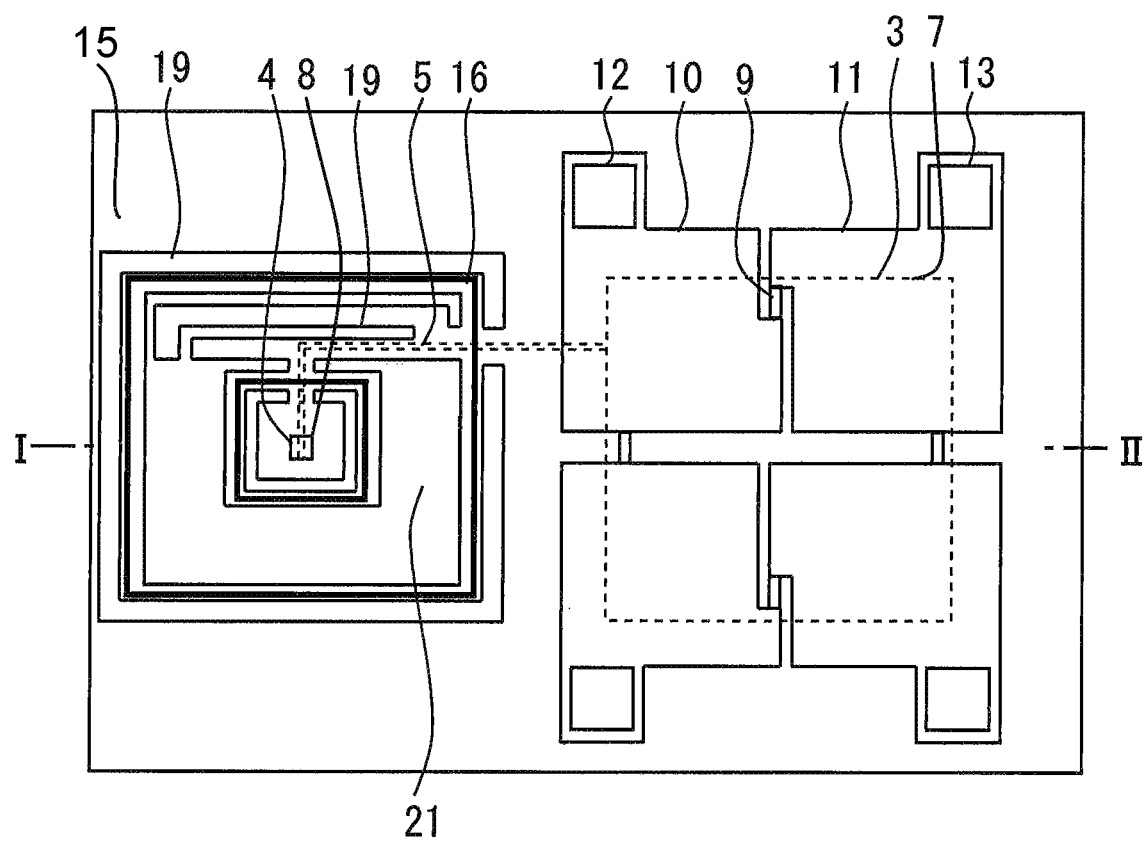
FIG. 29 is a plan view illustrating a semiconductor pressure sensor according to a fourth embodiment.
Figure 30:
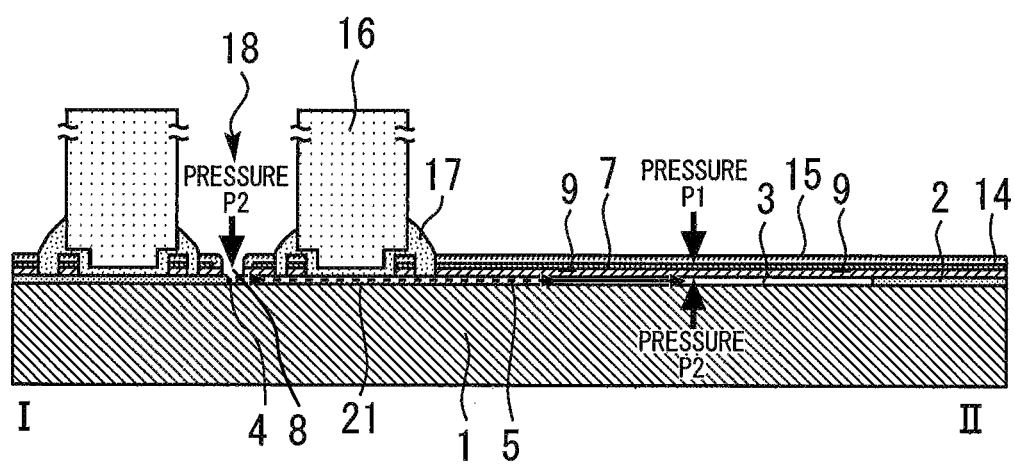
FIG. 30 is a cross-sectional view along I-II in FIG. 29.

FIG. 29 is a plan view illustrating a semiconductor pressure sensor according to a fourth embodiment. FIG. 30 is a cross-sectional view along I-II in FIG. 29. A fitting groove 21 is formed on the upper surface of the second silicon substrate 6 around the receiving pressure inlet 8. The fitting groove 21 is formed through photoengraving process and etching processing at the same time as the receiving pressure inlet 8 being formed. The pressure separating part 16 is fitted into the fitting groove 21, and is adhered on the upper surface of the second silicon substrate 6 with the adhesion layer 17. Other configurations and manufacturing process are similar to those of the first and the second embodiments.

By fitting the pressure separating part 16 into the fitting groove 21, it is possible to control a position where the pressure separating part 16 is adhered easily and accurately. Further, because adhesion strength of the pressure separating part 16 is increased, reliability of pressure separation of the pressure port 18 is improved.

Obviously many modifications and variations of the present disclosure are possible in the light of the above teachings. It is therefore to be understood that within the scope of the appended claims the invention may be practiced otherwise than as specifically described.

The entire disclosure of Japanese Patent Application No. 2020-060701, filed on Mar. 30, 2020 including specification, claims, drawings and summary, on which the convention priority of the present application is based, is incorporated herein by reference in its entirety.

The invention claimed is:

1. A semiconductor pressure sensor comprising:
   a first semiconductor substrate;
   an insulating film provided on the first semiconductor substrate and including a main opening, an introduction opening, and a connection opening which connects the main opening and the introduction opening;
   a second semiconductor substrate bonded to the first semiconductor substrate with the insulating film interposed therebetween and including a diaphragm provided above the main opening and a receiving pressure inlet connected to the introduction opening; and
   a gauge resistor provided on the diaphragm and converting a deformation amount of the diaphragm into change in electrical characteristics.

2. The semiconductor pressure sensor according to claim 1, further comprising a pressure separating part adhered on an upper surface of the second semiconductor substrate around the receiving pressure inlet and separating a pressure received on an upper surface of the diaphragm from a pressure received at the receiving pressure inlet.

3. The semiconductor pressure sensor according to claim 2, wherein the pressure separating part is adhered on the upper surface of the second semiconductor substrate with an adhesion layer, and
   an adhesion layer holding groove which holds the adhesion layer is provided on the upper surface of the second semiconductor substrate.

4. The semiconductor pressure sensor according to claim 2, wherein between the diaphragm and an adhesion portion in which the pressure separating part is adhered to the second semiconductor substrate, an adhesion stress separating groove is provided on the upper surface of the second semiconductor substrate.

5. The semiconductor pressure sensor according to claim 3, wherein between the diaphragm and an adhesion portion in which the pressure separating part is adhered to the second semiconductor substrate, an adhesion stress separating groove is provided on the upper surface of the second semiconductor substrate.

6. The semiconductor pressure sensor according to claim 2, wherein a fitting groove is provided on the upper surface of the second semiconductor substrate around the receiving pressure inlet, and
   the pressure separating part is fitted into the fitting groove.

7. The semiconductor pressure sensor according to claim 3, wherein a fitting groove is provided on the upper surface of the second semiconductor substrate around the receiving pressure inlet, and
   the pressure separating part is fitted into the fitting groove.

8. The semiconductor pressure sensor according to claim 4, wherein a fitting groove is provided on the upper surface of the second semiconductor substrate around the receiving pressure inlet, and
   the pressure separating part is fitted into the fitting groove.

9. The semiconductor pressure sensor according to claim 5, wherein a fitting groove is provided on the upper surface of the second semiconductor substrate around the receiving pressure inlet, and
   the pressure separating part is fitted into the fitting groove.

10. A method for manufacturing a semiconductor pressure sensor comprising:
    forming an insulating film on a first semiconductor substrate;
    etching the insulating film to form a main opening, an introduction opening, and a connection opening which connects the main opening and the introduction opening;
    bonding a second semiconductor substrate to the first semiconductor substrate with the insulating film interposed therebetween;
    polishing an entire upper surface of the second semiconductor substrate to form a diaphragm above the main opening;
    forming a receiving pressure inlet penetrating the second semiconductor substrate and connected to the introduction opening; and
    injecting an impurity ion to a part of the diaphragm to form a gauge resistor converting a deformation amount of the diaphragm into change in electrical characteristics.

* * * * *